(12) United States Patent
Song et al.

(10) Patent No.: US 10,183,517 B2
(45) Date of Patent: Jan. 22, 2019

(54) CORRECTION METHOD AND DEVICE OF LASER MARKING

(71) Applicant: Maxphotonics Corporation, Shenzhen (CN)

(72) Inventors: Jun Song, Shenzhen (CN); Yixin Jiang, Shenzhen (CN); Gaofeng He, Shenzhen (CN); Feng Jiang, Shenzhen (CN)

(73) Assignee: MAXPHOTONICS CORPORATION, Shenzhen (CN)

( * ) Notice: Subject to any disclaimer, the term of this patent is extended or adjusted under 35 U.S.C. 154(b) by 0 days.

(21) Appl. No.: 15/264,601

(22) Filed: Sep. 14, 2016

(65) Prior Publication Data

US 2017/0080733 A1 Mar. 23, 2017

(30) Foreign Application Priority Data

Sep. 22, 2015 (CN) .......................... 2015 1 0606880

(51) Int. Cl.
*B41M 5/24* (2006.01)
*G02B 26/10* (2006.01)
*G02B 27/00* (2006.01)

(52) U.S. Cl.
CPC .............. *B41M 5/24* (2013.01); *G02B 26/101* (2013.01); *G02B 26/105* (2013.01); *G02B 27/0031* (2013.01)

(58) Field of Classification Search
CPC ......... B23K 26/082; B41M 5/42; B41M 5/24; G05B 19/4097; G03G 15/043; B41J 29/393; G02B 26/101; G02B 26/105; G02B 27/0031

USPC ....................................................... 347/224
See application file for complete search history.

(56) References Cited

U.S. PATENT DOCUMENTS

| 2008/0003003 A1* | 1/2008 | Watanabe | G03G 15/043 |
| | | | 399/49 |
| 2011/0109918 A1* | 5/2011 | Conlon | B41J 29/393 |
| | | | 358/1.2 |
| 2015/0341607 A1* | 11/2015 | Kobayashi | H04N 9/3185 |
| | | | 348/744 |

FOREIGN PATENT DOCUMENTS

| CN | 102248817 A | 11/2011 | |
| EP | 0339402 A1 * | 11/1989 | ............. B23K 26/04 |
| EP | 0983863 A1 * | 3/2000 | .......... B41J 2/17546 |

* cited by examiner

*Primary Examiner* — Huan Tran
*Assistant Examiner* — Alexander D Shenderov
(74) *Attorney, Agent, or Firm* — Gokalp Bayramoglu

(57) ABSTRACT

The embodiments of the disclosure provide a correction method for laser marking, comprising: obtaining an image to be marked; in a preset coordinate system of a laser marker, determining a fracture region and a non-fracture region of the image to be marked; correcting the non-fracture region of the image to be marked by using a preset correcting formula; correcting the fracture region of the image to be marked by using a preset standard correction value and a preset weighted coefficient corresponding to coordinate position; and marking with the corrected image to be marked. According to the disclosure, by providing weighted correction for the mark points within the fracture region according to finely divided coordinate positions, the distortion correction for the fracture region can be completed without measuring deviation values of marking region with high density and high precision.

18 Claims, 5 Drawing Sheets

Normal pattern — Pincushion distortion pattern

Normal pattern — Barrel distortion pattern

CORRECTION METHOD AND DEVICE OF LASER MARKING

This application claims priority to Chinese Patent Application No. CN201510606880.1 filed on Sep. 22, 2015, the entire contents of all of which are incorporated herein by reference.

TECHNICAL FIELD

The disclosure relates to the field of laser marking technologies, and in particular to a correction method of laser marking and a correction device of laser marking.

BACKGROUND

When marking with laser, a galvanometer may cause a distortion of marked pattern. Marking distortion of the galvanometer may be caused by following two reasons. On one hand, since a deflection lens inside the galvanometer is rotated to realize a linear movement within a plane and an arc is formed by the deflection on the plane, an arc pincushion distortion may be formed on the plane, as shown in FIG. 1; and on the other hand, due to an optical aberration of a field lens, a barrel distortion may be caused, as shown in FIG. 2. In fact, aberration is a superposed distortion in X and directions caused by a superposition of the two distortions. The two distortions may directly impact on the marking effect, such that the marked pattern is distorted differently according to different coordinate of each point. Therefore, in the marking industry, solution of the two distortion is regarded as an important basis to judge the marking effect.

At present, there are two distortion correction methods, which are a formula method and a look-up table method. In the formula method, first, actual coordinates of mark points obtained by marking N (N may be selected according to required precision) uncorrected images to be marked is necessarily collected, and then a correcting formula is created by fitting differential values between the actual coordinates of mark points and preset desirable coordinates of mark points. With the correcting formula, a deviation value of the coordinate of each mark point on the marking plane can be obtained. Before marking, the deviation value of the coordinate of each mark point is first calculated, and then the deviation value of the coordinate is added to the actual coordinate of mark point to obtain a corrected coordinate of mark point. Marking with the corrected coordinate may correct the distortion. However, this correction method has a lower precision and may result in a fracture of image.

In the look-up table method, the image to be marked is divided into different regions. The deviation values of mark points in each region can be obtained by correction experiment. The deviation values of mark points are saved as a coordinate deviation table. When there is a need to mark, the deviation value of each mark point can be obtained by looking up the table. The smaller region it is divided into, the higher the correction precision would be. A disadvantage of this method is in that, when there is a need to measure a deviation table with high density and high precision, operations would be complicated, time consumption would be significant and it would be difficult to measure a great number of points.

SUMMARY

In the view of above problems, embodiments of the disclosure are proposed to provide a correction method of laser marking and a corresponding correction device of laser marking to overcome or at least partially resolve above problems.

In order address above problems, embodiments of the disclosure provide a correction method for laser marking, including:
  obtaining an image to be marked;
  in a preset coordinate system of a laser marker, determining a fracture region and a non-fracture region of the image to be marked;
  correcting the non-fracture region of the image to be marked by using a preset correcting formula;
  correcting the fracture region of the image to be marked by using a preset standard correction value and a preset weighted coefficient corresponding to coordinate position; and
  marking with the corrected image to be marked.

In the meanwhile, the disclosure also provides a correction device for laser marking, including at least one processor; and a memory communicably connected with the at least one processor for storing instructions executable by the at least one processor, wherein execution of the instructions by the at least one processor causes the at least one processor to:
  obtain an image to be marked;
  determine a fracture region and a non-fracture region of the image to be marked in a preset coordinate system of a laser marker;
  correct the non-fracture region of the image to be marked by using a preset correcting formula;
  correct the fracture region of the image to be marked by using a preset standard correction value and a preset weighted coefficient corresponding to coordinate position; and
  mark with the corrected image to be marked.

The disclosure also provides a non-transitory computer readable medium having computer programs stored thereon that, when executed by one or more processors of a correction device for laser marking, cause the correction device to perform: obtain an image to be marked; determine a fracture region and a non-fracture region of the image to be marked in a preset coordinate system of a laser marker; correct the non-fracture region of the image to be marked by using a preset correcting formula; correct the fracture region of the image to be marked by using a preset standard correction value and a preset weighted coefficient corresponding to coordinate position; and mark with the corrected image to be marked.

The embodiments of the disclosure may have following advantages:

According to the disclosure, by providing weighted correction for the mark points within the fracture region according to finely divided coordinate positions, the distortion correction for the fracture region can be completed without measuring deviation values of marking region with high density and high precision.

DESCRIPTION OF THE EMBODIMENTS

In order to more clearly understand above objects, features and advantages of the disclosure, hereinafter the disclosure will be further described in detail in conjunction with accompanying drawings and specific implementations.

Figure 1:
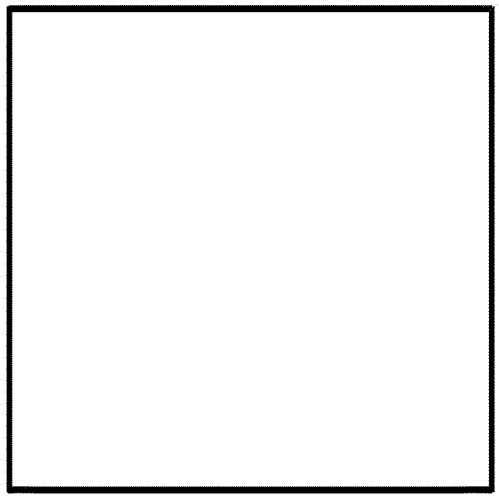
FIG. 1 is a marked image with pincushion distortion.
Figure 1:
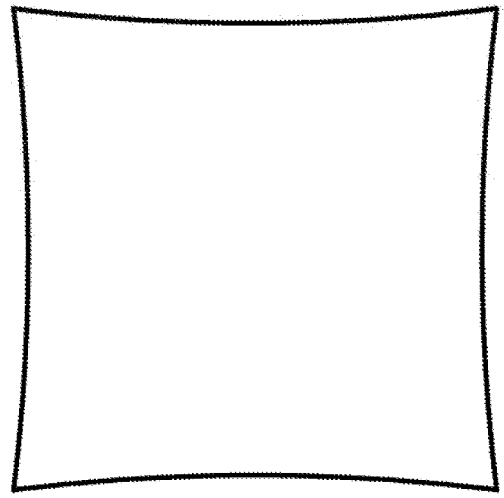
Figure 2:
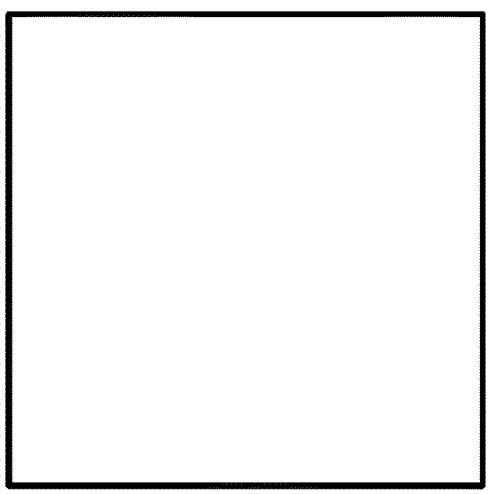
FIG. 2 is a marked image with barrel distortion.
Figure 2:
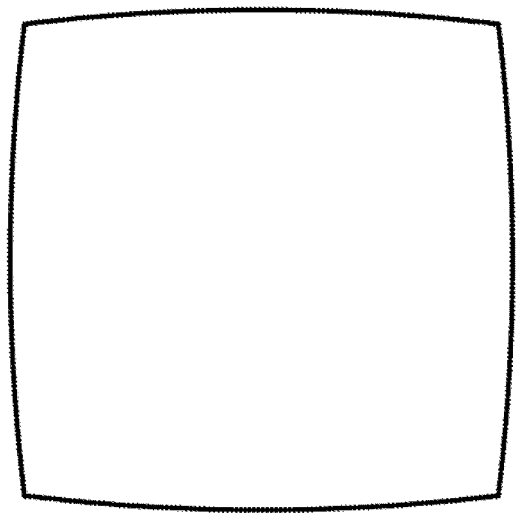
Figure 3:
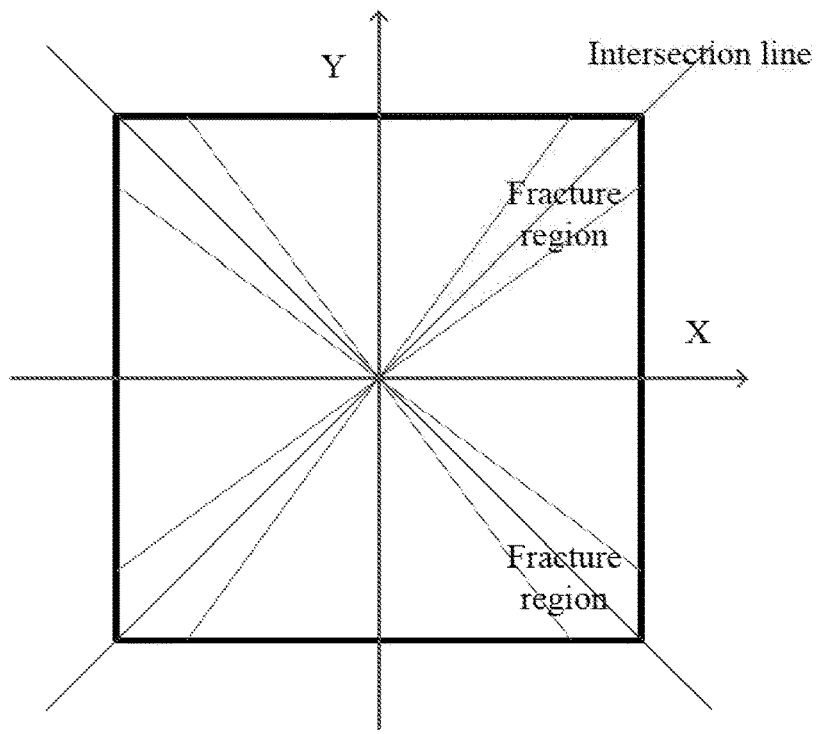
FIG. 3 is a marked image with fracture region generated when using a formula correction method.

As shown in FIG. 3, when the formula method is used to print a square, first N points are captured on an uncorrected marked image, deviations between actual coordinates and deal coordinates of the N points, and the N points are fitted into a curvilinear formula by a fitting method. The curvilinear formula is a deviation formula of coordinate of each mark point after distortion. In such a manner, four curvilinear formulas of four sides can be derived. With the formulas, a deviation value of each point on a marking plane would be known. When marking in practice, the deviation of each coordinate point is first calculated, and the deviation of the coordinate is added to the actual coordinate such that the distortion can be corrected. The disadvantages of this method are in that the precision would be low and curvilinear regression and curvilinear intersection which are also referred to as a intersection line may be generated at a crossing between adjacent two of the four sides, i.e., in the vicinity of 45 degree bevel edge. Regions on both sides of the intersection line are referred to as fracture regions within which the mark points are discontinuous due to distortion.

According to one of main conceptions of the embodiments of the disclosure, by the determination of a fracture region and a non-fracture region of an object to be marked, the disclosure may provide correction for the non-fracture region by using the correcting formula generated by the formula method in advance, while providing weighted correction for the fracture region according to weighted coefficient corresponding to finely divided coordinate positions.

Figure 4:
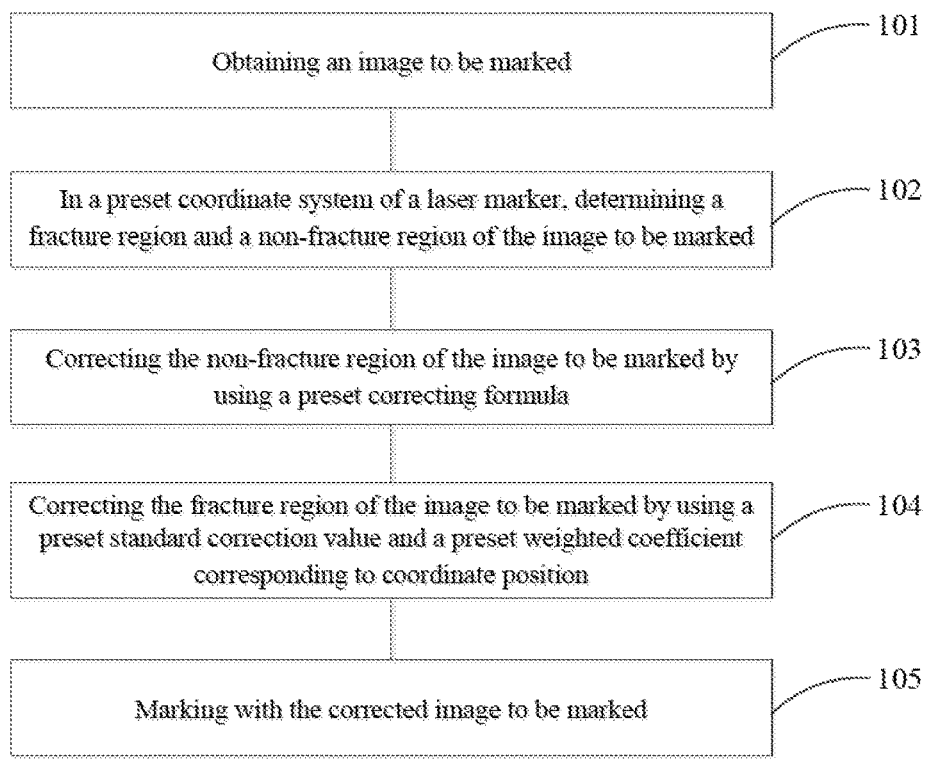
FIG. 4 is a flowchart of steps of a correction method for laser marking according to an embodiment of the disclosure.

With reference to FIG. 4, it shows a flowchart of steps of a correction method for laser marking according to an embodiment of the disclosure. The method may particularly comprise steps of:

Step 101, obtaining an image to be marked;

Step 102, in a preset coordinate system of a laser marker, determining a fracture region and a non-fracture region of the image to be marked;

Step 103, correcting the non-fracture region of the image to be marked by using a preset correcting formula;

Step 104, correcting the fracture region of the image to be marked by using a preset standard correction value and a preset weighted coefficient corresponding to coordinate position; and Step 105, marking with the corrected image to be marked.

In this embodiment of the disclosure, the non-fracture region and the fracture region of the image to be marked are first determined, and then the correction is provided for the mark points within the non-fracture region by using the correcting formula generated by the formula method in advance, while the weighted correction is provided for the mark points within the fracture region according to the weighted coefficient corresponding to finely divided coordinate position and the preset standard correction value.

As a preferred example of the embodiment of the disclosure, Step 102 may particularly comprise sub-steps of:

Sub-step S11, in the preset coordinate system of the laser marker, determining a portion of the image to be marked inside a preset angular area which regards an origin as a starting point to be the fracture region; and Sub-step S12, determining a portion of the image to be marked outside the preset angular area to be the non-fracture region.

For example, as shown in FIG. 3, when a square is printed, a centre of the square may coincide with an origin of the preset coordinate system of the laser marker, and a fracture region of the square may be within a range of plus/minus 5 degrees with respect to central lines having positive and negative 45 degree, respectively i.e., within the range of positive and negative 40-50 degree and positive and negative 130-140 degree.

Following the determination of the non-fracture region and the fracture region, the non-fracture region and the fracture region can be corrected by different methods. As a preferred example of the embodiment of the disclosure, Step 103 may particularly comprise sub-steps of:

Sub-step S21, calculating deviation values of mark points within the non-fracture region by using the preset correcting formula, wherein the correcting formula is created by fitting differential values between the actual coordinates of mark points obtained by marking an uncorrected image to be marked and preset desirable coordinates of mark points; and Sub-step S22, correcting coordinates of corresponding mark points by using the deviation values of mark points within the non-fracture region.

In this embodiment of the disclosure, the non-fracture region is corrected by using the correcting formula generated by the formula method in advance. By fitting differential values between the actual coordinates of mark points obtained by marking an uncorrected image to be marked in advance and preset desirable coordinates of mark points, the fitted collecting formula can be derived.

When marking in practice, the deviation value of each mark point can be obtained by the fitted correcting formula, and then the deviation value is superposed to the actual coordinate to correct the mark point.

As a preferred example of the embodiment of the disclosure, Step 104 may particularly comprise sub-steps of:

Sub-step S31, calculating deviation values of mark points within the fracture region by using a preset standard correction value and a preset weighted coefficient corresponding to the coordinate position, wherein the standard correction value is a correction value of a mark point on a line with a preset angle which regards an origin as a starting point, and the weighted coefficient is inversely proportional to an included angle between a line on which the mark point and origin are located and an X-axis of the coordinate system; and Sub-step S32, correcting coordinates of corresponding mark points by using the deviation values of mark points within the fracture region.

As a preferred example of the embodiment of the disclosure, the fracture region is divided into different angular sections according to a present number and the mark points within each angular section have the same preset weighted coefficient.

Positive and negative values of the preset weighted coefficient are the same as positive and negative values of a product of a horizontal coordinate times a vertical coordinate of mark point.

In this embodiment of the disclosure, the weighted correction is provided for mark points within the fracture region according to the weighted coefficient corresponding to finely divided coordinate positions and the preset standard correction value. The standard correction value is a correction value of a mark point on a line with a preset angle which regards an origin as a stalling point. Generally, a correction value of points on a central line of the fracture region is selected as the standard correction value. For example, when a square is marked, the correction value of points on intersection lines with positive and negative 45 degree is used as the standard correction value. It is assumed that the points on intersection lines have a horizontal coordinate deviation of $\Delta X1$ and a vertical coordinate deviation of $\Delta Y1$ and $\Delta X1$ is equal to $\Delta Y1$. Points on both sides of the intersection lines are corrected by the weighted coefficient. In particular, following formulas may be employed:

horizontal coordinate deviation $\Delta X=(\Delta X1*k+\Delta Y1*(1-k))/2$, vertical coordinate deviation $\Delta Y=(\Delta X1*k+\Delta Y1*(1-k))/2$, wherein k represents the weighted coefficient. The weighted coefficient k is particularly dependent on coordinate point positions. The weighted coefficient is inversely proportional to an included angle between a line on which the mark point and origin are located and an X-axis of the coordinate system. As the line on which the mark point and origin becomes closed to X-axis, the weighted coefficient corresponding to the mark point is greater, while as the line on which the mark point and origin becomes away from X-axis, the weighted coefficient corresponding to the mark point is smaller. The weighted coefficient is within the range of 0-1.

Further, in this embodiment of the disclosure, the fracture region is divided into different angular sections, and the mark points within each angular section have the same weighted coefficient. The weighted coefficient of each section is divided from 0 to 1. As the fracture region is more finely divided, the weighted coefficient could have higher precision and the corrected image could have less fracture and hopping. By experimental analysis, the fracture region is divided into 20 portions such that the corrected image has no fracture. In addition, in the coordinate system of the laser marker, mark points in different quadrants may correspond to the weighted coefficients having different plus/minus sips. Positive and negative values of the weighted coefficient are the same as positive and negative values of a product of a horizontal coordinate times a vertical coordinate of mark point. For example, a mark point in a first quadrant of the coordinate system of the laser marker has a positive horizontal coordinate and a positive vertical coordinate, such that the product of the horizontal coordinate times the vertical coordinate is positive and the weighted coefficient of coordinate point is positive. A coordinate point in a second quadrant has a negative horizontal coordinate and a positive vertical coordinate, such that the product of the horizontal coordinate times the vertical coordinate is negative and the weighted coefficient of the coordinate point is negative.

Figure 5:
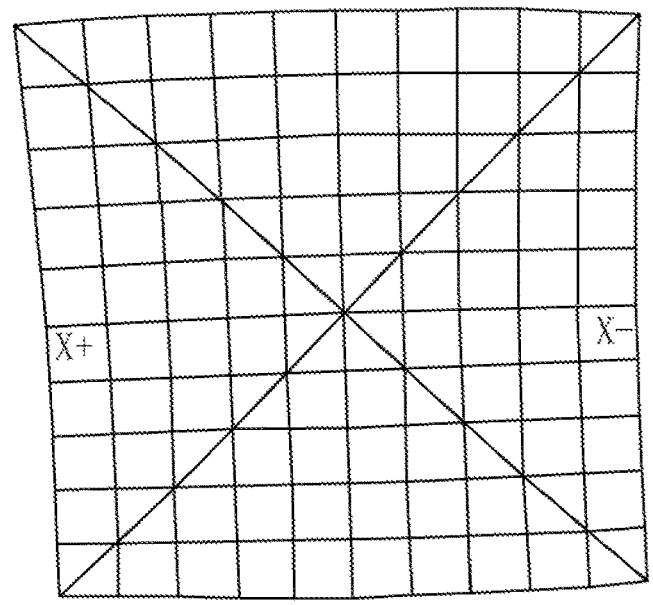
FIG. 5 is an uncorrected effect image of laser marking.
Figure 6:
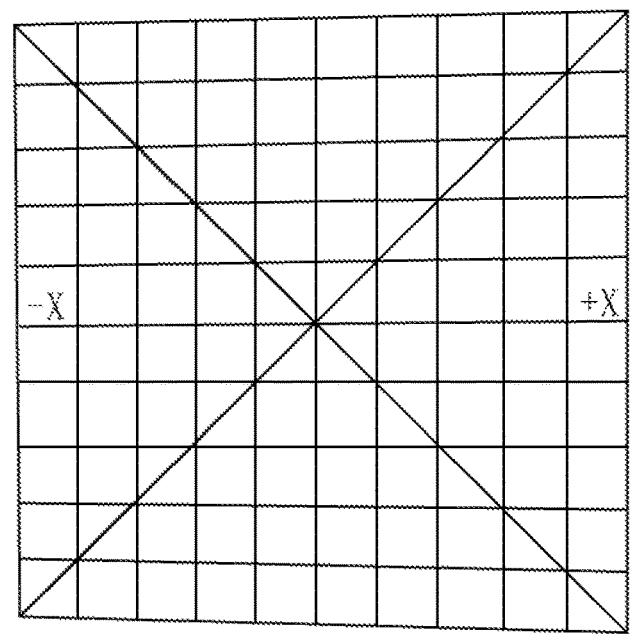
FIG. 6 is an effect image of a correction embodiment for laser marking according to the disclosure.

With reference to FIG. 5, it is an uncorrected effect image of laser marking; and with reference to FIG. 6, it is an effect image of a correction embodiment for laser marking according to the disclosure. In this embodiment, when there is a need to mark square lattices, it is first necessary to determine the fracture region and the non-fracture region in the square lattices. Regarding the origin of the coordinate system of laser marker as the starting point and regarding Fines having positive and negative 45 degree as the intersection lines, the fracture region is a region within a range of plus/minus 5 degree with respect to the intersection line. That is, the ranges of positive and negative 40-50 degree and positive and negative 130-140 degree are the fracture regions of the square lattices.

Mark points within the non-fracture region are corrected by using the correcting formula created by the formula method in advance, while mark points within the fracture region are corrected according to the preset standard correction value on the intersection line and the weighted coefficient corresponding to the coordinate point position. Herein, in this embodiment, the fracture region is divided into 10 sections according to the angle. The weighted coefficients in each section are the same. The weighted coefficients in sections are varied from 0 to 1 according to the include angle between the section and X-axis. The weighted coefficient of the fracture region within different quadrants of coordinate system is the same as the product of the horizontal coordinate times the vertical coordinate in the quadrant. After the image is corrected, the pincushion distortion and the barrel distortion of marked image may be eliminated.

It should be explained that the method embodiments as described above, for the purpose of brief description, are described as a series of combined actions. However, it should be appreciated by those skilled in the art that the embodiments of the disclosure should not be restricted by the sequence of the actions as set forth, since some of actions could be performed in different sequence or simultaneously according to the embodiments of the disclosure. Moreover, it should also be appreciated by those skilled in the art that, the embodiments as described in the specification are preferred embodiments and actions. concerned are not necessarily required in the embodiments of the disclosure.

Figure 7:
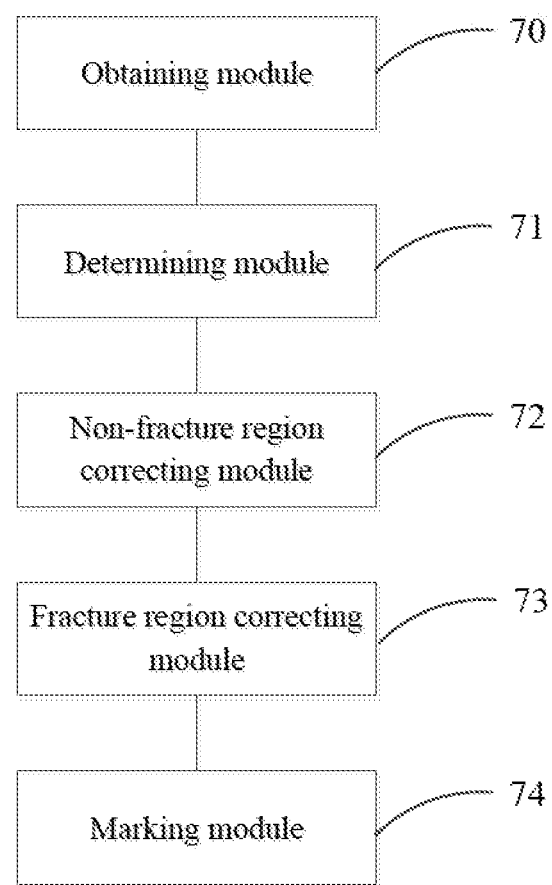
FIG. 7 is a block diagram of a correction device for laser marking according to an embodiment of the disclosure.

With reference to FIG. 7, it shows a block diagram of a correction device for laser marking according to an embodiment of the disclosure. The device may particularly comprise following modules:

an obtaining module 70, configured to obtain an image to be marked;

a determining module 71, configured to determine a fracture region and a non-fracture region of the image to be marked in a preset coordinate system of a laser marker;

a non-fracture region correcting module 72, configured to correct the non-fracture region of the image to be marked by using a preset correcting formula;

a fracture region correcting module 73, configured to correct the fracture region of the image to be marked by using a preset standard correction value and a preset weighted coefficient corresponding to coordinate position; and a marking module 74, configured to mark with the corrected image to be marked.

As a preferred example of the embodiment of the disclosure, the determining module may further comprise:

a fracture region determining sub-module, configured to determine a portion of the image to be marked inside a preset angular area which regards an origin as a stalling point to be the fracture region, in the preset coordinate system of the laser marker; and a non-fracture region determining sub-module, configured to determine a portion of the image to be marked outside the preset angular area to be the non-fracture region.

As a preferred example of the embodiment of the disclosure, the non-fracture region correcting module may further comprise:

a non-fracture region deviation calculating sub-module, configured to calculate deviation values of mark points within the non-fracture region by using the preset correcting formula, wherein the correcting formula is created by fitting differential values between the actual coordinates of mark points obtained by marking an uncorrected image to be marked and preset desirable coordinates of mark points; and a non-fracture region deviation correcting sub-module, configured to correct coordinates of corresponding mark points by using the deviation values of mark points within the non-fracture region.

As a preferred example of the embodiment of the disclosure, the fracture region correcting module may further comprise:

a fracture region deviation calculating sub-module, configured to calculate deviation values of mark points within the fracture region by using a preset standard correction value and a preset weighted coefficient corresponding to the coordinate position, wherein the standard correction value is a correction value of a mark point on a line with a preset angle which regards an origin as a starting point, and the weighted coefficient is inversely proportional to an included angle between a line on which the mark point and origin are located and an X-axis of the coordinate system; and a fracture region deviation correcting sub-module, configured to correct coordinates of corresponding mark points by using the deviation values of mark points within the fracture region.

In this embodiment of the disclosure, the fracture region is divided into different angular sections according to a present number and the mark points within each angular section have the same preset weighted coefficient.

Positive and negative values of the preset weighted coefficient are the same as positive and negative values of a product of a horizontal coordinate times a vertical coordinate of mark point.

Since the device embodiments are substantially similar to the method embodiments, the description thereof is relatively brief. As for the related parts thereof, reference may be made to the relevant description of the method embodiment.

The various embodiments in the specification have been explained step by step. Each of the embodiments has only emphasized the differences from others, and the same or similar parts between embodiments could be referred to each other.

It should be understood by those skilled in the art, embodiments of in the disclosure could be provided as a method, a device and a computer program product. Therefore, the embodiments of the disclosure may employ the forms of complete hardware embodiment, complete software embodiment or combination of hardware and software. Further, the embodiments of in the disclosure may employ the form of computer program product realizable on one or more of computer available recording medium (including but not limited to magnetic disk storage medium, CD-ROM and optical storage medium, for example) containing computer available program codes.

Figure 8:
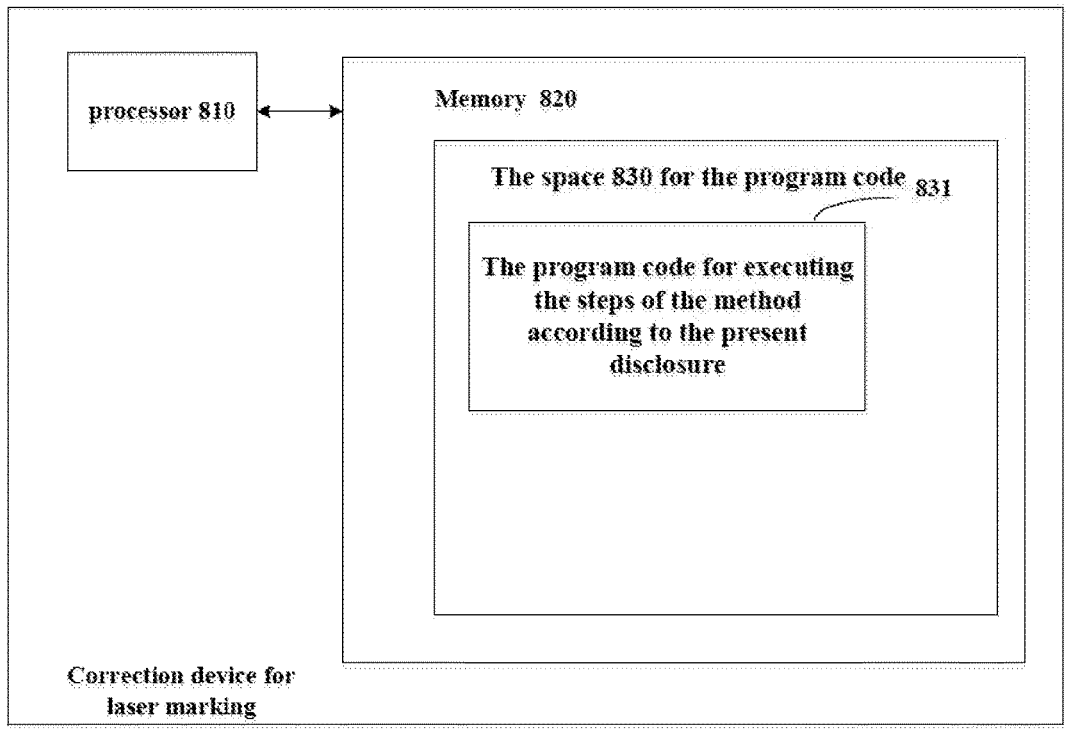
FIG. 8 schematically illustrates a block diagram of a correction device for laser marking for executing the method according to the disclosure.
Figure 9:
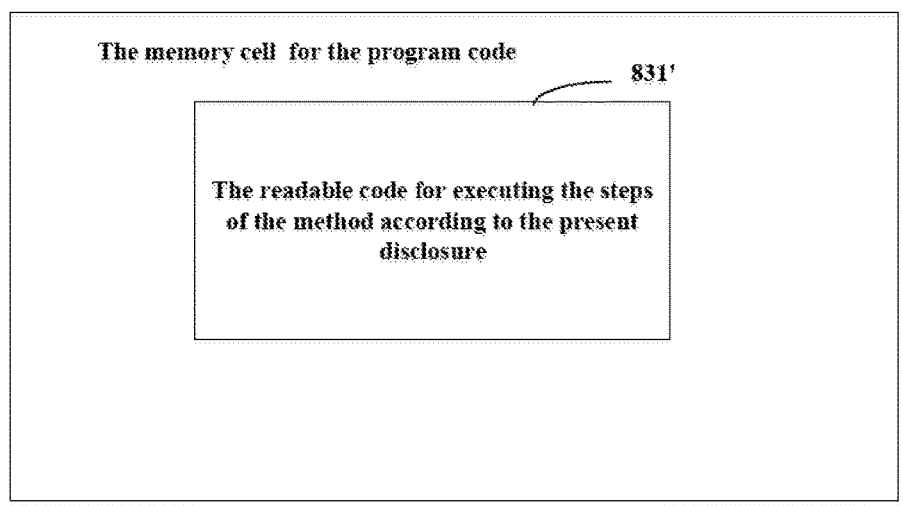
FIG. 9 schematically illustrates a block diagram of an information server for executing the method according to the disclosure.

For example, FIG. 8 illustrates a block diagram of a correction device for laser marking for executing the method according the disclosure. Traditionally, the device includes processor 810 and a computer program product or a computer readable medium in form of memory 820. Memory 820 could be electronic memories such as flash memory, EEPROM (Electrically Erasable Programmable Read-Only Memory), EPROM, hard disk or ROM. Memory 820 has memory space 830 for executing program codes 831 of any steps in the above methods. For example, memory space 830 for program codes may include respective program codes 831 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 6. The memory cells may be provided with memory sections, memory spaces, etc., similar to memory 820 of the device as shown in FIG. 8. The program codes may be compressed for example in an appropriate form. Usually, the memory cell includes computer readable codes 831' which can be read for example by processors 810. When these codes are operated on the device, the device may execute respective steps in the method as described above.

The embodiments of in the disclosure have been described with reference to flow chart and/or block diagram of method, terminal device (system) and computer program product according thereto. It should be understood that each of steps and/or modules in flow chats and/or block diagrams, and combination of steps and/or modules in flow charts and/or block diagrams could be realized by computer program instructions. The computer program instructions may be provided for a universal computer, a dedicated computer, an embedded processor or a processor of other programmable data processing terminal device to generate a machine, such that the instructions executed by the computer or the processor of other programmable data processing terminal device may form devices for realizing functions specified by one or more steps in the flow charts and/or one or more modules in the block diagrams.

The computer program instructions may also be stored in computer readable memory capable of booting the computer or other programmable data processing terminal device to run in a designated mode, such that the instructions stored in the computer readable memory may form a manufactured product containing instruction device. The instruction device may realize functions specified by one or more steps in the flow charts and/or one or more modules in the block diagrams.

The computer program instructions may also be loaded into the computer or other programmable data processing terminal device, such that the computer or other programmable terminal device may execute a series of operation steps to generate processing realizable by the computer, and in turn the instructions executed on the computer or other programmable terminal device may provide steps for realizing functions specified by one or more steps in the flow charts and/or one or more modules in the block diagrams.

Although preferred embodiments of the disclosure have been described, those skilled in the art may make additional amendments and modifications to the embodiments with substantial creative concept thereof. Therefore, the appended claims are intended to be constructed as encompassing the preferred embodiments and all the amendments and modifications falling into the scope of the embodiments of the disclosure.

In the end, it will be explained that, the terms "first", "second", etc. are only used herein to distinguish one element or operation from another element or operation, and does not necessarily require or suggest that there are any actual relationship or sequence between these elements or operations. Further, the terms "comprise", "include" and any other variants thereof are intended to cover a non-exclusive "comprise", so that process, method, product or terminal device which includes a series of elements may include not only those elements but also other elements that do not be definitely listed herein, or also may include inherent elements of the process, method, product or terminal device. In the absence of more restrictions, an element defined by the statement "includes a . . . " is not meant to exclude other same elements in the process, method, product or terminal device including this element.

The correction method for laser marking and the correction device for laser marking provided in the disclosure have been described in detail. Herein the principles and implementations of the disclosure are illustrated by way of specific examples. The embodiments described above are only intended to help understand the method and main concept of the disclosure. Meanwhile, for an ordinary person skilled in the art, variations could be made to the specific embodiments and their application scope in accordance with the concept of the disclosure. In summary, the contents of the specification should not be construed as limiting of the disclosure.

What is claimed is:

1. A correction method for laser marking,
wherein the correction method is carried out by a correction device comprising at least one processor; and
a memory communicably connected with the at least one processor for storing instructions executable by the at least one processor, wherein execution of the instructions by the at least one processor causes the at least one processor;
the method comprises:
obtaining an image to be marked;
in a preset coordinate system of a laser marker, determining a fracture region and a non-fracture region of the image to be marked;
wherein the fracture region of the image comprises a preset angular area enclosed by lines forming a preset angle at an origin of the coordinate system;
wherein the non-fracture region of the image is a region of the image excluding the fracture region;
correcting the non-fracture region of the image to be marked by using a preset correcting formula; wherein, the preset correcting formula is generated by fitting differential values between actual mark points obtained by marking an uncorrected image to be marked in advance and preset desirable coordinates of the mark points;
correcting the fracture region of the image to be marked by using a preset standard correction value and a preset weighted coefficient corresponding to coordinate position; wherein the preset standard correction value is a correction value of a standard mark point on a line forming a preset angle with the x-axis at the origin of the coordinate system; wherein the preset weighted coefficient corresponding to the coordinate position is inversely proportional to an included angle between a line joining the coordinate position with the origin and the x-axis at the origin of the coordinate system;
wherein the correction value of the standard mark point is calculated by the preset correcting formula; and
marking with the corrected image to be marked.

2. The method according to claim 1, wherein the step of, in a preset coordinate system of a laser marker, determining a fracture region and a non-fracture region of the image to be marked comprises:
in the preset coordinate system of the laser marker, determining a portion of the image to be marked inside a preset angular area which regards an origin as a starting point to be the fracture region; and
determining a portion of the image to be marked outside the preset angular area to be the non-fracture region.

3. The method according to claim 1, wherein the step of correcting the non-fracture region of the image to be marked by using a preset correcting formula comprises:
calculating deviation values of mark points within the non-fracture region by using the preset correcting formula, wherein the correcting formula is created by fitting differential values between the actual coordinates of mark points obtained by marking an uncorrected image to be marked and preset desirable coordinates of mark points; and
correcting coordinates of corresponding mark points by using the deviation values of mark points within the non-fracture region.

4. The method according to claim 3, wherein the step of correcting the fracture region of the image to be marked by using a preset standard correction value and a preset weighted coefficient corresponding to coordinate position comprises:
calculating deviation values of mark points within the fracture region by using a preset standard correction value and a preset weighted coefficient corresponding to the coordinate position, wherein the standard correction value is a correction value of a mark point on a line with a preset angle which regards an origin as a starting point, and the weighted coefficient is inversely proportional to an included angle between a line on which the mark point and origin are located and an X-axis of the coordinate system; and
correcting coordinates of corresponding mark points by using the deviation values of mark points within the fracture region.

5. The method according to claim 4, wherein the fracture region is divided into different angular sections according to a present number and the mark points within each angular section have the same preset weighted coefficient.

6. The method according to claim 5, wherein positive and negative values of the preset weighted coefficient are the same as positive and negative values of a product of a horizontal coordinate times a vertical coordinate of mark point.

7. A correction device for laser marking, wherein the device comprises:
at least one processor; and
a memory communicably connected with the at least one processor for storing instructions executable by the at least one processor, wherein execution of the instructions by the at least one processor causes the at least one processor:
obtaining an image to be marked;
determining a fracture region and a non-fracture region of the image to be marked in a preset coordinate system of a laser marker;
wherein the fracture region of the image comprises a preset angular area enclosed by lines forming a preset angle at an origin of the coordinate system;

wherein the non-fracture region of the image is a region of the image excluding the fracture region;

correcting the non-fracture region of the image to be marked by using a preset correcting formula; wherein, the preset correcting formula is generated by fitting differential values between actual mark points obtained by marking an uncorrected image to be marked in advance and preset desirable coordinates of the mark points;

correcting the fracture region of the image to be marked by using a preset standard correction value and a preset weighted coefficient corresponding to a coordinate position; wherein the preset standard correction value is a correction value of a standard mark point on a line forming a preset angle with the x-axis at the origin of the coordinate system; wherein the preset weighted coefficient corresponding to the coordinate position is inversely proportional to an included angle between a line joining the coordinate position with the origin and the x-axis at the origin of the coordinate system;

wherein the correction value of the standard mark point is calculated by the preset correcting formula; and marking with the corrected image to be marked.

8. The correction device according to claim 7, wherein the determine a fracture region and a non-fracture region of the image to be marked in a preset coordinate system of a laser marker further comprises:

determining a portion of the image to be marked inside a preset angular area which regards an origin as a starting point to be the fracture region, in the preset coordinate system of the laser marker; and determining a portion of the image to be marked outside the preset angular area to be the non-fracture region.

9. The correction device according to claim 7, wherein the fracture region is divided into different angular sections according to a present number and the mark points within each angular section have the same preset weighted coefficient.

10. The correction device according to claim 9, wherein positive and negative values of the preset weighted coefficient are the same as positive and negative values of a product of a horizontal coordinate times a vertical coordinate of mark point.

11. The correction device according to claim 7, wherein the fracture region of the image comprises an angular region between lines forming angles 40° and 50° with an x-axis at the origin of the coordinate system, an angular region between lines forming angles 130° and 140° with the x-axis at the origin of the coordinate system, an angular region between lines forming angles −40° and −50° with the x-axis at the origin of the coordinate system, and an angular region between lines forming angles −130° and −140° with the x-axis at the origin of the coordinate system.

12. The correction device according to claim 7, wherein the preset weighted coefficient is in a range of 0 to 1.

13. A non-transitory computer readable medium having computer programs stored thereon that, when executed by one or more processors of a correction device comprising at least one processor and a memory communicably connected with the at least one processor for storing instructions executable by the at least one processor, wherein execution of the instructions by the at least one processor causes the at least one processor for laser marking, cause the correction device to perform:

obtaining an image to be marked;

determining a fracture region and a non-fracture region of the image to be marked in a preset coordinate system of a laser marker;

wherein the fracture region of the image comprises a preset angular area enclosed by lines forming a preset angle at an origin of the coordinate system;

wherein the non-fracture region of the image is a region of the image excluding the fracture region;

correcting the non-fracture region of the image to be marked by using a preset correcting formula; wherein, the preset correcting formula is generated by fitting differential values between actual mark points obtained by marking an uncorrected image to be marked in advance and preset desirable coordinates of the mark points;

correcting the fracture region of the image to be marked by using a preset standard correction value and a preset weighted coefficient corresponding to coordinate position; wherein the preset standard correction value is a correction value of a standard mark point on a line forming a preset angle with the x-axis at the origin of the coordinate system; wherein the preset weighted coefficient corresponding to the coordinate position is inversely proportional to an included angle between a line joining the coordinate position with the origin and the x-axis at the origin of the coordinate system;

wherein the correction value of the standard mark point is calculated by the preset correcting formula; and marking with the corrected image to be marked.

14. The non-transitory computer readable medium according to claim 13, wherein the determine a fracture region and a non-fracture region of the image to be marked in a preset coordinate system of a laser marker further comprises:

determining a portion of the image to be marked inside a preset angular area which regards an origin as a starting point to be the fracture region, in the preset coordinate system of the laser marker; and determining a portion of the image to be marked outside the preset angular area to be the non-fracture region.

15. The non-transitory computer readable medium according to claim 13, wherein the correct the fracture region of the image to be marked by using a preset standard correction value and a preset weighted coefficient corresponding to coordinate position further comprises:

calculating deviation values of mark points within the non-fracture region by using the preset correcting formula, wherein the correcting formula is created by fitting differential values between the actual coordinates of mark points obtained by marking an uncorrected image to be marked and preset desirable coordinates of mark points; and correcting coordinates of corresponding mark points by using the deviation values of mark points within the non-fracture region.

16. The non-transitory computer readable medium according to claim 15, wherein the correct the fracture region of the image to be marked by using a preset standard correction value and a preset weighted coefficient corresponding to coordinate position further comprises:

calculating deviation values of mark points within the fracture region by using a preset standard correction value and a preset weighted coefficient corresponding to the coordinate position, wherein the standard correction value is a correction value of a mark point on a line with a preset angle which regards an origin as a starting point, and the weighted coefficient is inversely proportional to an included angle between a line on which the mark point and origin are located and an X-axis of the coordinate system; and correcting coordinates of corresponding mark points by using the deviation values of mark points within the fracture region.

17. The non-transitory computer readable medium according to claim 16, wherein the fracture region is divided into different angular sections according to a present number and the mark points within each angular section have the same preset weighted coefficient.

18. The non-transitory computer readable medium according to claim 17, wherein positive and negative values of the preset weighted coefficient are the same as positive and negative values of a product of a horizontal coordinate times a vertical coordinate of mark point.

* * * * *